(12) United States Patent
Davis et al.

(10) Patent No.: US 9,489,121 B2
(45) Date of Patent: Nov. 8, 2016

(54) OPTIMAL DISPLAY AND ZOOM OF OBJECTS AND TEXT IN A DOCUMENT

(75) Inventors: Tristan Davis, Redmond, WA (US); Ali Taleghani, Seattle, WA (US); Alyshia Marie Olsen, Seattle, WA (US); David Benjamin Robins, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/287,911

(22) Filed: Nov. 2, 2011

(65) Prior Publication Data

US 2013/0106907 A1 May 2, 2013

(51) Int. Cl.
*G06F 3/0488* (2013.01)
*G06F 3/0484* (2013.01)

(52) U.S. Cl.
CPC .......... *G06F 3/0488* (2013.01); *G06F 3/0484* (2013.01); *G06F 2203/04806* (2013.01)

(58) Field of Classification Search
USPC ........................................................ 345/666
See application file for complete search history.

(56) References Cited

U.S. PATENT DOCUMENTS

| | | | |
|---|---|---|---|
| 5,533,174 A | 7/1996 | Flowers et al. | |
| 5,615,384 A * | 3/1997 | Allard et al. | 715/800 |
| 5,754,873 A * | 5/1998 | Nolan | 715/235 |
| 6,073,036 A | 6/2000 | Heikkinen | |
| 6,188,432 B1 * | 2/2001 | Ejima | 348/240.99 |
| 6,211,856 B1 * | 4/2001 | Choi et al. | 345/666 |
| 6,337,924 B1 | 1/2002 | Smith | |

(Continued)

FOREIGN PATENT DOCUMENTS

CN 102150121 A 8/2011

OTHER PUBLICATIONS

Rutter, et al.; "The Elements of Typographic Style Applied to the Web"; Oct. 2004; Retrieved on: Sep. 19, 2011, Available at: http://webtypography.net/Rhythm_and_Proportion/Horizontal_Motion/2.1.2/.

(Continued)

*Primary Examiner* — Maurice L McDowell, Jr.
(74) *Attorney, Agent, or Firm* — Jessica Meyers; Tom Wong; Micky Minhas

(57) ABSTRACT

An object is zoomed upon selection. A scaling factor is calculated for zooming the object based on current viewing properties of a document and properties of the object as well as the current size of the application window and device. The scaling factor to zoom the object is calculated such that after the object is zoomed, viewing the object is similar to a viewing experience for the rest of the document. Text of the document may be displayed to increase the readability of the document. For example, the text may be displayed such that each line of displayed text averages out to a predetermined number of characters (e.g. 50-75 characters) per line. A display size and width of an average character are determined and used to calculate how many columns of text to display within the display. When the zoom level of the text changes, the text is redisplayed.

20 Claims, 12 Drawing Sheets

(56) References Cited

U.S. PATENT DOCUMENTS

| | | | |
|---|---|---|---|
| 6,366,294 B1* | 4/2002 | Cunningham et al. | 345/666 |
| 6,389,437 B2 | 5/2002 | Stoub | |
| 6,437,799 B1* | 8/2002 | Shinomi | 345/666 |
| 6,456,305 B1 | 9/2002 | Qureshi | |
| 6,466,203 B2 | 10/2002 | Van Ee | |
| 6,720,965 B1 | 4/2004 | Hirsawa | |
| 6,774,890 B2* | 8/2004 | Engholm | 345/173 |
| 7,025,209 B2 | 4/2006 | Hawkins | |
| 7,075,512 B1* | 7/2006 | Fabre et al. | 345/156 |
| 7,075,513 B2* | 7/2006 | Silfverberg et al. | 345/157 |
| 7,487,447 B1 | 2/2009 | Jerger | |
| 7,516,402 B2 | 4/2009 | Koivisto | |
| 8,279,241 B2* | 10/2012 | Fong | 345/661 |
| 8,504,368 B2 | 8/2013 | Katae et al. | |
| 8,766,928 B2* | 7/2014 | Weeldreyer et al. | 345/173 |
| 2002/0175928 A1 | 11/2002 | Kanbayashi | |
| 2005/0177783 A1 | 8/2005 | Agrawala et al. | |
| 2006/0046686 A1 | 3/2006 | Hawkins | |
| 2006/0290681 A1* | 12/2006 | Ho et al. | 345/173 |
| 2007/0003139 A1 | 1/2007 | Gotoh | |
| 2008/0252662 A1 | 10/2008 | Hyatt | |
| 2009/0109243 A1* | 4/2009 | Kraft et al. | 345/660 |
| 2009/0141147 A1* | 6/2009 | Alberts et al. | 348/240.99 |
| 2009/0189904 A1 | 7/2009 | Roth | |
| 2010/0111499 A1* | 5/2010 | Tsurumi | 386/107 |
| 2010/0318959 A1* | 12/2010 | Rowan et al. | 717/105 |
| 2011/0035702 A1* | 2/2011 | Williams et al. | 715/800 |
| 2011/0231746 A1* | 9/2011 | Rohrabaugh et al. | 715/205 |
| 2012/0042240 A1 | 2/2012 | Oliveira | |
| 2012/0110438 A1 | 5/2012 | Peraza | |
| 2012/0159314 A1 | 6/2012 | Schrier | |
| 2012/0287163 A1* | 11/2012 | Djavaherian | 345/667 |
| 2013/0007602 A1 | 1/2013 | Dougherty | |
| 2013/0104027 A1 | 4/2013 | Bennett et al. | |

OTHER PUBLICATIONS

Hoist, C.; "Readability: The Optimal Line Length"; Nov. 1, 2010; Retrieved on: Sep. 19, 2011, Available at: http://baymard.com/blog/line-length-readability.

Gilenwater, Z.; "Why Browser Zoom shouldn't Kill Flexible Layouts", Retrieved on: Sep. 19, 2011, Available at: http://zomigi.com/blog/why-browser-zoom-shouldnt-kill-flexible-layouts/.

Tverskov, J.; "MAX-WIDTH and Flexible Layout with Short Lines"; Oct. 7, 2003; Retrieved on: Sep. 19, 2011, Available at: http://www.smackthemouse.com/20031007.

U.S. Appl. No. 13/288,326, filed Nov. 3, 2011, entitled "Optimal Display and Zoom of Objects and Text in a Document"; Inventors: Davis, et al.

Office Action mailed Dec. 17, 2012, in U.S. Appl. No. 13/288,326.

Office Action mailed Sep. 27, 2013, in U.S. Appl. No. 13/288,326, 23 pgs.

Office Action mailed Mar. 26, 2014, in U.S. Appl. No. 13/288,326, 18 pgs.

"First Office Action and Search Report Issued in Chinese Patent Application No. 201210431775.5", Mailed Date: Feb. 3, 2015, 17 Pages.

"Second Office Action Issued in Chinese Patent Application No. 201210431775.5", Mailed Date: Aug. 3, 2015, 13 Pages.

Office Action mailed Sep. 11, 2014, in U.S. Appl. No. 13/288,326, 16 pgs.

Office Action mailed Dec. 15, 2015, in U.S. Appl. No. 13/288,326, 38 pgs.

Chinese Third Office Action dated Jan. 25, 2016 in Application No. 201210431775.5, 14 pgs.

U.S. Appl. No. 13/288,326, Notice of Allowance mailed Apr. 29, 2016, 12 pgs.

Chinese Fourth Office Action dated Jul. 15, 2016 in Application No. 201210431775.5, 6 pages. With English Translation.

* cited by examiner

1200

On the Insert tab, the galleries include items that are designed to coordinate with the overall look of your document. You can use these galleries to insert tables, headers, footers, lists, cover pages, and other document building blocks. When you create pictures, charts, or diagrams, they also coordinate with your current document look. You can easily change the formatting of selected text in the document text by choosing a look for the selected text from the Styles gallery on the Home tab. You can also format text directly by using the other controls on the Home tab.

Most controls offer a choice of using the look from the current theme or using a format that you specify directly. To change the overall look of your document, choose new Theme elements on the Design tab. To change the looks available in the Style gallery, use the Style Set gallery. Both the Themes gallery and the Style Set gallery provide reset commands so that you can always restore the look of your document to the original contained in your current template. On the Insert tab, the galleries include items that are designed to coordinate with the overall look of your document.

You can use these galleries to insert tables, headers, footers, lists, cover pages, and other document building blocks. When you create pictures, charts, or diagrams, they also coordinate with your current document look. You can easily change the

*Fig. 12*

OPTIMAL DISPLAY AND ZOOM OF OBJECTS AND TEXT IN A DOCUMENT

BACKGROUND

It is common for text and objects shown on a display to be resized independently. For example, objects in a document may be resized for better readability, printing, a different display size, and the like. Many objects, however, are created with an intimate knowledge of their original size (e.g. a table that is sized to make optimal use of the page's width). Resizing an object can result in at least a portion of the contents to scale improperly and be difficult to read, while resizing the entire document by the same scale factor can result in making the entire document difficult to consume unnecessarily.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An object is zoomed upon selection. A scaling factor is calculated for zooming the object based on current viewing properties of a document and properties of the object. The determined viewing properties may include a current zoom level of the document and/or a font size of text within the document. The determined object properties (e.g. a font size in the object) are used to calculate the scaling factor to zoom the object such that after the object is zoomed, the object is similar to a viewing experience for the rest of the document. As well, text of the document may be displayed to increase the readability of the document. For example, the text may be displayed such that each line of displayed text averages out to a predetermined number of characters (e.g. 50-75 characters) per line. A display size and width of an average character are determined and used to calculate how many columns of text to display within the display. When the desired font size of the text changes, the text is redisplayed to maintain the average of the desired number of characters per line.

BRIEF DESCRIPTION OF THE DRAWINGS

FIG. 12 shows maintaining a ratio as a zoom level is increased for display of text.

DETAILED DESCRIPTION

Figure 1:
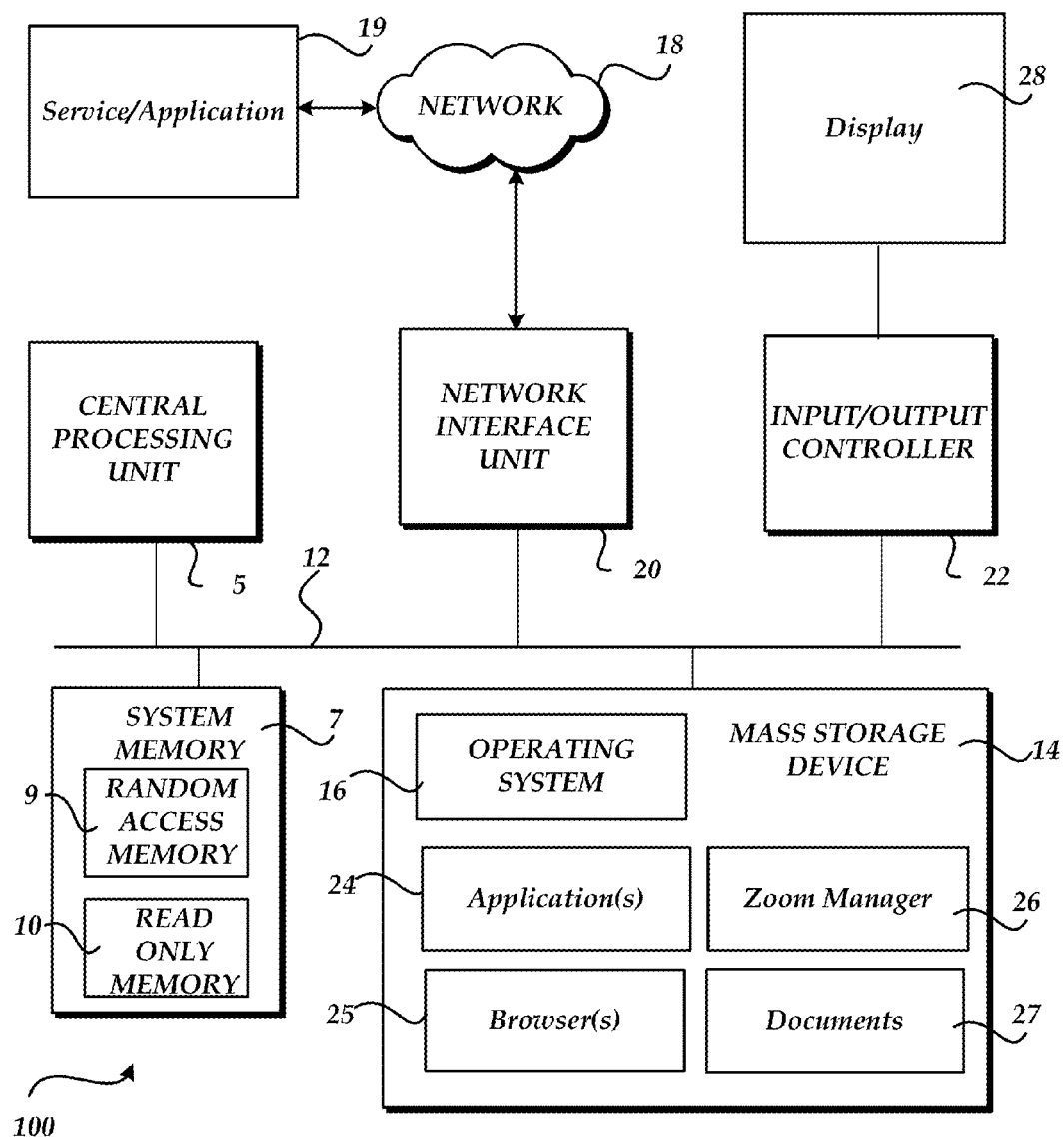
FIG. 1 illustrates an exemplary computing device.

Referring now to the drawings, in which like numerals represent like elements, various embodiments will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Referring now to FIG. 1, an illustrative computer architecture for a computer 100 utilized in the various embodiments will be described. The computer architecture shown in FIG. 1 may be configured as a desktop computing device, a server computing device, a mobile computing device (e.g. smartphone, notebook, tablet . . . ) and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24, and other program modules, such as Web browser applications 25, documents 27, and zoom manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

According to various embodiments, computer 100 may operate in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, such as a touch input device. The touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display 28. The input/output controller 22 may also provide output to one or more display screens, a printer, or other type of output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, may be integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a computer, such as the WINDOWS 7®, WINDOWS SERVER®, operating systems from MICROSOFT CORPORATION of Redmond, Wash.

The mass storage device 14 and RAM 9 may also store one or more program modules. In particular, the mass storage device 14 and the RAM 9 may store one or more applications 24, such as productivity applications, and may store one or more Web browsers 25. The Web browser 25 is operative to request, receive, render, and provide interactivity with electronic documents, such as a Web page. According to an embodiment, the Web browser comprises the INTERNET EXPLORER Web browser application program from MICROSOFT CORPORATION and the applications 24 are the MICROSOFT OFFICE suite of applications.

Zoom manager 26 is configured to zoom objects and display text within a document. Zoom manager 26 may be a part of one or more different applications/services. For example, zoom manager 26 may be a part of a cloud based multi-tenant service that provides resources (e.g. services, data . . . ) to different tenants. Zoom manager 26 may be a part of other programs/services 19, such as, but not limited to: word processing applications, presentation applications, spreadsheet applications, drawing applications, and the like. According to an embodiment, zoom manager 26 operates in conjunction with the MICROSOFT OFFICE applications. The applications may be available online in a cloud based service and/or may be installed on a client computing device.

Zoom manager 26 is configured to determine when an object is selected to be zoomed. The selection may be through a touch gesture (e.g. tap) and/or through some other selection action (e.g. mouse, stylus, selecting a menu option . . . ). Zoom manager 26 calculates a scaling factor that is used when zooming the object. The scaling factor is based on current viewing properties of a document and properties of the object as well as the current size of the application window and device. The determined viewing properties may include a current zoom level of the document and/or a font size of text within the document and/or some other viewing/display characteristics. The determined object properties (e.g. a font size in the object, a current scaling of the object, . . . ) are used when calculating the scaling factor to zoom the object such that after the object is zoomed, the object is similar to a viewing experience for the rest of the document. For example, the object may be initially zoomed by a scaling factor of 145% since the other text in the document is currently displayed using a 16 point font, but the text in the object to zoom is currently displayed at an 11 point font. Zooming the object to 145% displays the object similarly to the other content in the document. Other methods may be used to determine the scaling factor (see description below). For example, the object may be zoomed such that the entire object fits on the screen. The object may be zoomed such that the user may only scroll in one direction to see all of the object (one axis fits on the screen).

Zoom manager 26 may also be configured to display text of a document to increase the readability of the document. For example, the text may be displayed in columns such that each line of displayed text averages out to a predetermined number of characters (e.g. 50-75 characters) per line. Zoom manager 26 determines a current display size and width of an average character are determined and used to calculate how many columns of text to display within the display. Zoom manager 26 attempts to use the display space efficiently. For example, if changing the number of characters down to 50 characters per line results in 3 columns, while using 60 characters would result in 2 columns with a lot of blank space, zoom manager 26 may select to display the text at 50 characters per line. When the zoom level of the text changes, the text is redisplayed to maintain the average of the desired number of characters per line.

Additional details regarding the operation of zoom manager 26 will be provided below.

Figure 2:
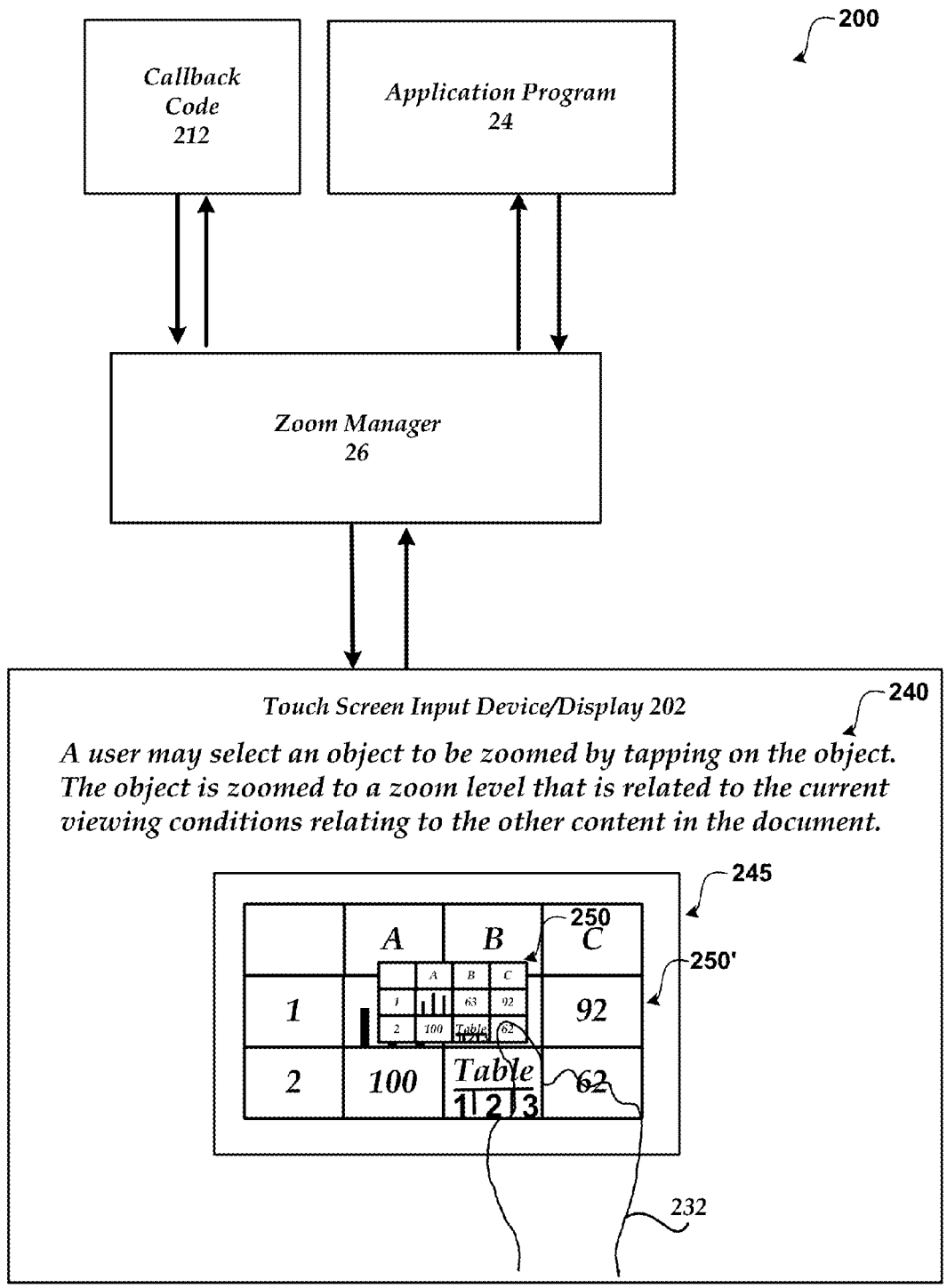
FIG. 2 illustrates an exemplary system for zooming objects and displaying text within a document.

FIG. 2 illustrates an exemplary system for zooming objects and displaying text within a document. As illustrated, system 200 includes application program 24, callback code 212, zoom manager 26, and touch screen input device/display 202.

In order to facilitate communication with the zoom manager 26, one or more callback routines, illustrated in FIG. 2 as callback code 212 may be implemented. According to one embodiment, application program 24 is an application that is configured to receive input from a touch-sensitive input device 202. For example, zoom manager 26 may provide information to application 24 in response to a user's finger (i.e. finger on hand 232) selecting an object within a document to zoom.

Touch input system 200 as illustrated comprises a touch screen input device 202 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micromachined accelerometers, piezoelectric devices, capacitive sensors, resistive sensors, inductive sensors, laser vibrometers, and LED vibrometers.

Zoom manager 26 is configured to zoom objects and display text within a document, such as document 240. The document may be associated with one or more applications. For example, the document may be a word-processing document, a spreadsheet document, a presentation document (e.g. a slide), a drawing, and the like. Zoom manager 26 is configured to operate in conjunction with the application 24 that displays the document and object. Application 24 may be available online in a cloud based service and/or may be installed on a client computing device.

Zoom manager 26 is configured to determine when an object is selected to be zoomed. The selection may be through a touch gesture (e.g. tap) and/or through some other selection action (e.g. mouse, stylus, selecting a menu option . . . ). In the current example, a user has tapped on object 250 using their hand 232. In response to the selection of object 250, zoom manager 26 calculates a scaling factor that is used to zoom the object. The scaling factor is based on current viewing properties of a document and properties of the object as well as the current size of the application window and device. The determined viewing properties may include a current zoom level of the document and/or a font size of text within the document and/or some other viewing/display characteristics. In the current example, text 240 is displayed using a 14 point font. The determined object properties (e.g. a font size in the object, a current scaling of the object, . . . ) are used to calculate the scaling factor to zoom the object such that after the object is zoomed, the object is similar to a viewing experience for the rest of the document. In the current example, the object has text that is displayed in a 6 point font. Zooming object by a scaling factor that results in object 250 being approximately 233% results in a similar viewing experience for a viewer (e.g. 14/6 =2.33). According to an embodiment, the zoomed object 250' is displayed within zoom window 245. As discussed, other methods may be used to determine the scaling. For example, the selected object may be displayed to a predetermined size within the viewable area (e.g. 50%, 75%, 90%). According to an embodiment, when immersive zoom is invoked, the contents of the window are dimmed, to provide more focus on the object.

Non-image objects and image objects may be scaled differently. According to an embodiment, for Non-Image Objects (e.g. Tables, Textboxes, Charts, and SmartArt) the following logic applies. When both dimensions of the zoomed object fit within the zoom window, then the zoomed object is centered in the zoom window. When one dimension of the zoomed object fits within the zoom window, the smaller dimension relative to the zoom window is centered along its axis, allowing scrolling/panning along the other axis. When neither dimension of the zoomed object fits within the zoom window, the zoomed object is scaled such that the smaller dimension of the zoomed object relative to the zoom window fits along one axis, allowing scrolling/panning on the other axis.

According to an embodiment, for Image-Objects (e.g. Images, OLE objects, Shapes), the following logic applies. When both dimensions of the zoomed object fit within the zoom window, then the zoomed object is centered in the zoom window. When one dimension fits, the larger dimension is scaled relative to the zoom window. According to an embodiment, the image object is resized to 90% of the zoom window on the larger side, and center the smaller side relative to the app window along its axis. When neither dimension fits, both dimensions are scaled until one of the dimension fits within the resize window. According to an embodiment, the image object is resized to 90% of the zoom window on the larger side relative to the app window, and center the smaller side along its axis.

A scrollbar may not be shown when an object exceeds a dimension size. For example, when the immersive zoom window is invoked using touch, scrollbars are not shown. Instead, a user may navigate the object using a panning gesture.

Figure 3:
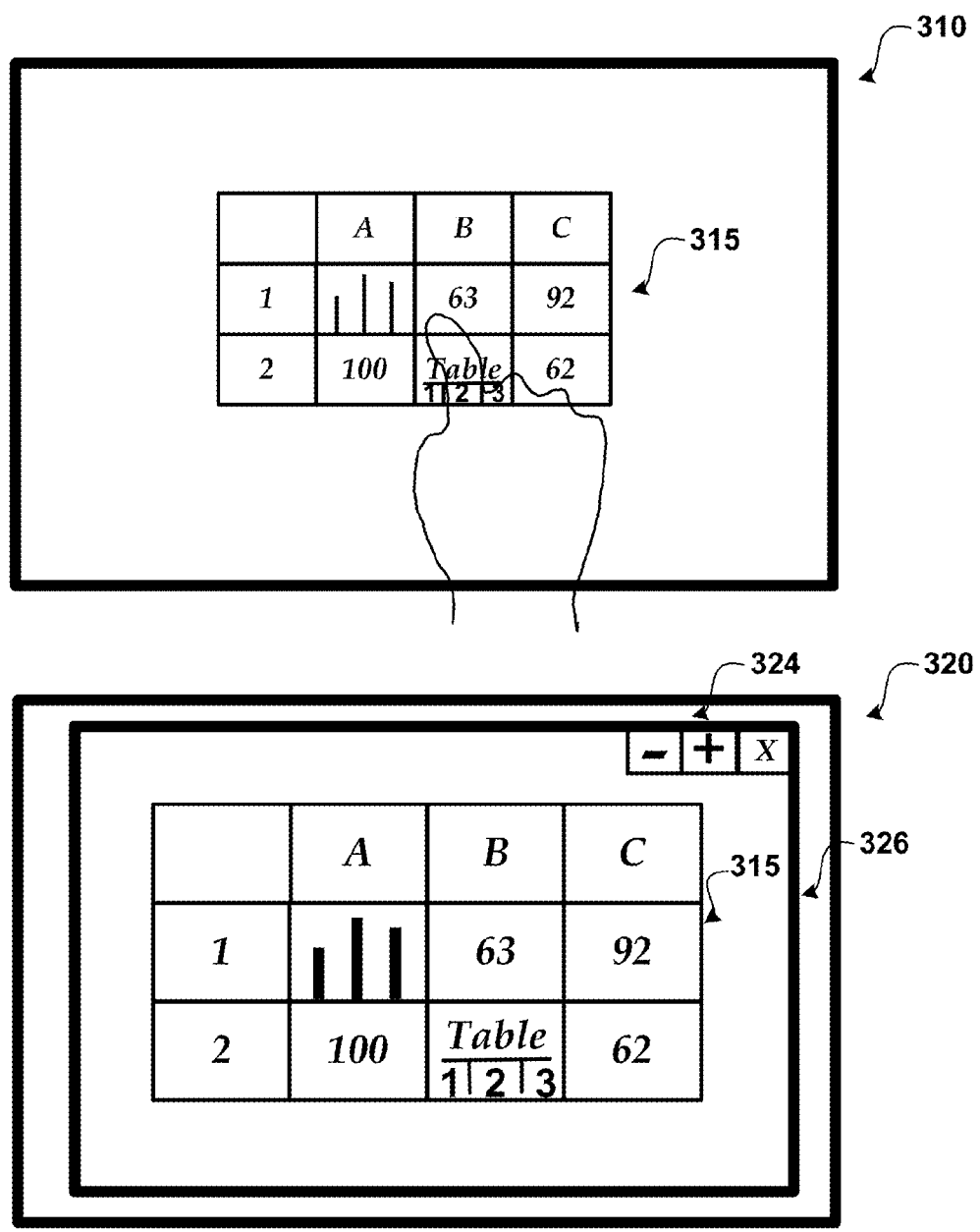
FIG. 3 shows an example of selecting an object to zoom and zooming the object.

FIG. 3 shows an example of selecting an object to zoom and zooming the object.

Display 310 shows an initial display of object 315. The object may be an image object (e.g. Images, OLE objects, Shapes, WordArt, . . . ) or a non-image object (e.g. Tables, Textboxes, Charts, SmartArt, . . . ).

Display 320 shows object 315 zoomed in response to a user selection. In response to the zoom selection, a zoom window 325 is displayed. Zoom window may be configured to be different sizes, such as 90% of the size of a current display window or some size that is larger than the object that is selected to zoom. According to an embodiment, the zoom window is sized proportionally (e.g. 60%, 75%, 90% . . . ) and relative to the display window (e.g. display 310) that shows the object.

When an object is selected for zooming, a determination is made as to a current zoom characteristics of the document that the image is displayed within. For example, a user may have changed the zoom level and/or font size of the document to a specified level (e.g. +5% zoom level compared to default, increased font size from 12 point to 14 point). The current viewing properties of the document are used in determining an initial zoom amount for the selected object. Properties of the selected object are determined (e.g. font size of any text within object, a current scaling factor applied to the object). The selected object is attempted to be initially zoomed to a level that corresponds to the current zoom characteristics of the window. A zoom value is calculated to display the object at the desired zoom level. In some situations (e.g. this example), both dimensions (horizontal, vertical) of the object after zooming will fit within the zoom window 326. In other situations, one of the dimensions (horizontal or vertical) of the object after zooming will fit within the zoom window. In other situations, neither of the dimensions horizontal or vertical) of the object after zooming will fit within the zoom window (See FIGS. 4-6 and related discussion).

Zoom sizing options (e.g. −,+buttons 324) may be used to increase/decrease the size of the zoomed object. According to an embodiment, the zoom sizing buttons zoom to predetermined zoom levels instead of allowing a user to incrementally change a zoom level percentage (e.g. 1% larger, 2% larger . . . ). The predetermined zoom levels may be determined based on a size of the currently zoomed object and available space within the zoom window. The zoom levels may also be based on a size of the object to increase a font size of the text within the object a predetermined amount (e.g. currently 12 point to 14, 18, 24 . . . ) sizes. According to an embodiment, there is one larger zoom level from the initial zoom level and one smaller zoom level compared to the initial zoom level for the object.

Figure 4:
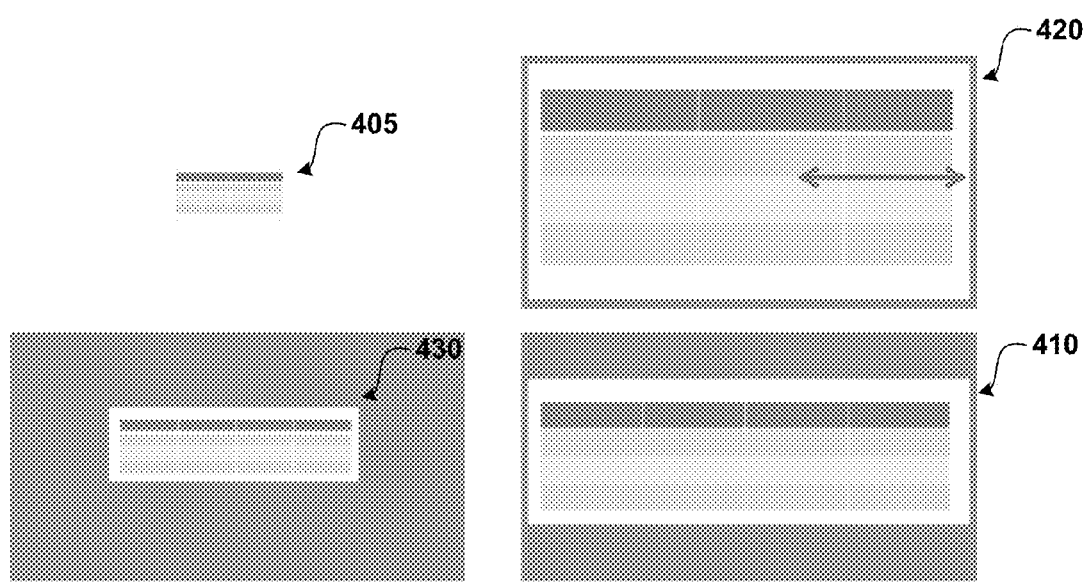
FIG. 4 shows an object that fits in a window in a small zoom state, an initial zoom state and a large zoom state

FIG. 4 shows an object that fits in a window in a small zoom state, an initial zoom state and a large zoom state.

Display 405 shows an object before zooming.

Display 410 shows the object displayed in an initial zoom state within a zoom window. The object is zoomed such that the larger dimension of the object when zoomed fits within the zoom window. The smaller dimension is centered within the zoom window.

Display 420 shows the object displayed in a large zoom state. The object is zoomed such that the smaller dimension fits (e.g. 90%) within the zoom window. A scroll bar may be displayed along the other dimension to allow scrolling of the zoomed object.

Display 430 shows the object displayed in a small zoom state. The object is center within the zoom window.

Figure 5:
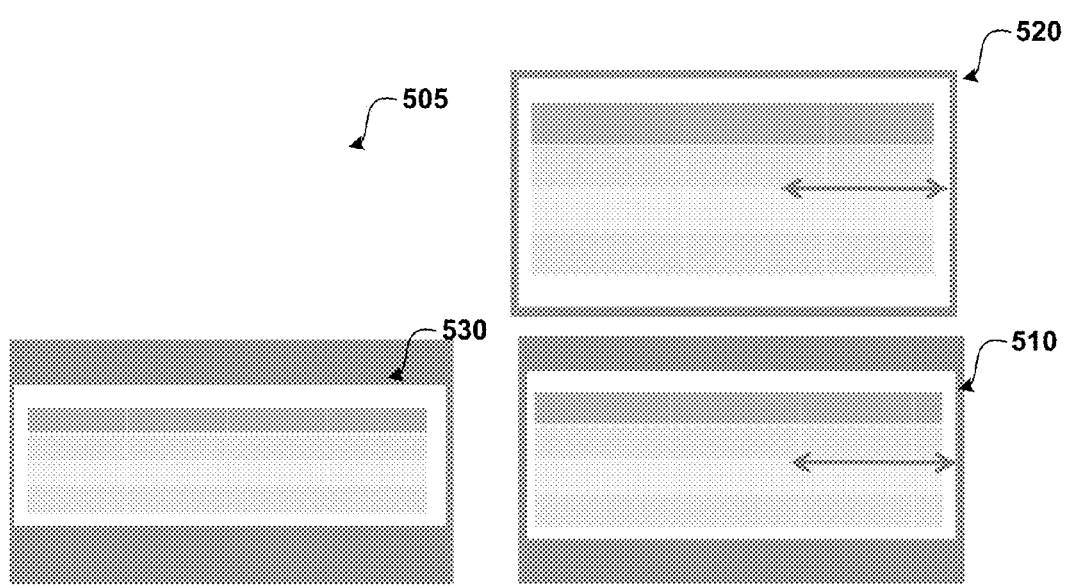
FIG. 5 shows an object that includes a dimension that does not fit into a window after zooming to at least one of: a small zoom state, an initial zoom state and a large zoom state.

FIG. 5 shows an object that includes a dimension that does not fit into a window after zooming to at least one of: a small zoom state, an initial zoom state and a large zoom state.

Display 505 shows an object before zooming.

Display 510 shows the object displayed in an initial zoom state. The smaller dimension is centered within the zoom window and the larger dimension is zoomed to the determined zoom size. A scroll bar may be displayed for the dimension that does not fit within the zoom window.

Display 520 shows the object displayed in a large state. The smaller dimension is zoomed to fit within the zoom window. A scroll bar may be displayed for the dimension that does not fit within the zoom window.

Display 530 shows the object displayed in a small state. The object is zoomed such that both dimensions fit within the zoom window.

Figure 6:
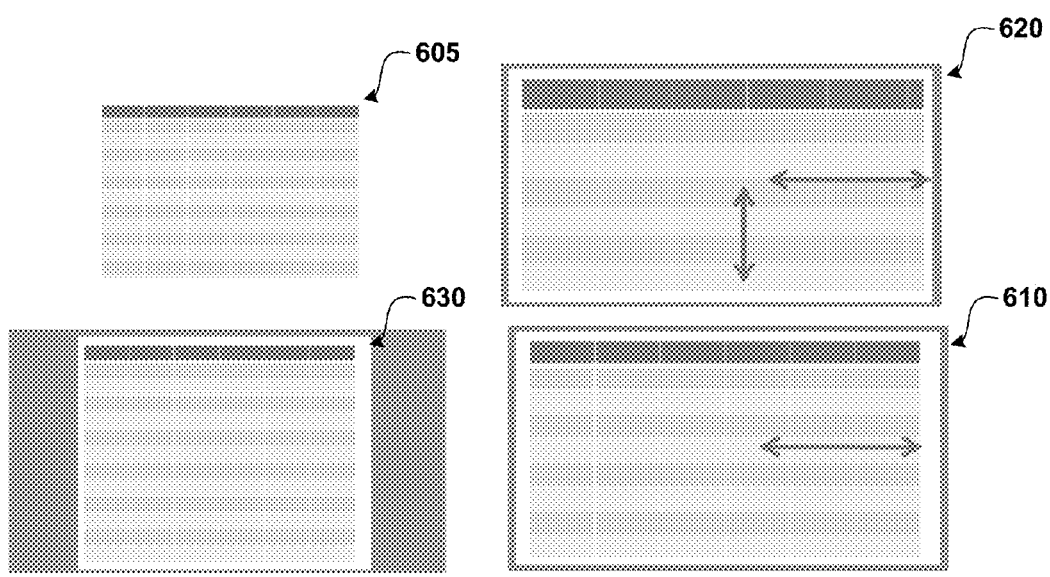
FIG. 6 shows an object that includes at least one dimension that does not fit in a window in a small zoom state, an initial zoom state and a large zoom state.

FIG. 6 shows an object that includes at least one dimension that does not fit in a window in a small zoom state, an initial zoom state and a large zoom state.

Display 605 shows an object before zooming.

Display 610 shows the object displayed in an initial zoom state. The larger dimension is zoomed to fit within the zoom window and the smaller dimension is centered within the zoom window after zooming.

Display 620 shows the object displayed in a large state. The smaller dimension is zoomed to fit within the zoom window. Scroll bars may be displayed for the dimensions that do not fit within the zoom window.

Display 630 shows the object displayed in a small state. The object is zoomed such that both dimensions fit in the zoom window.

Figure 7:
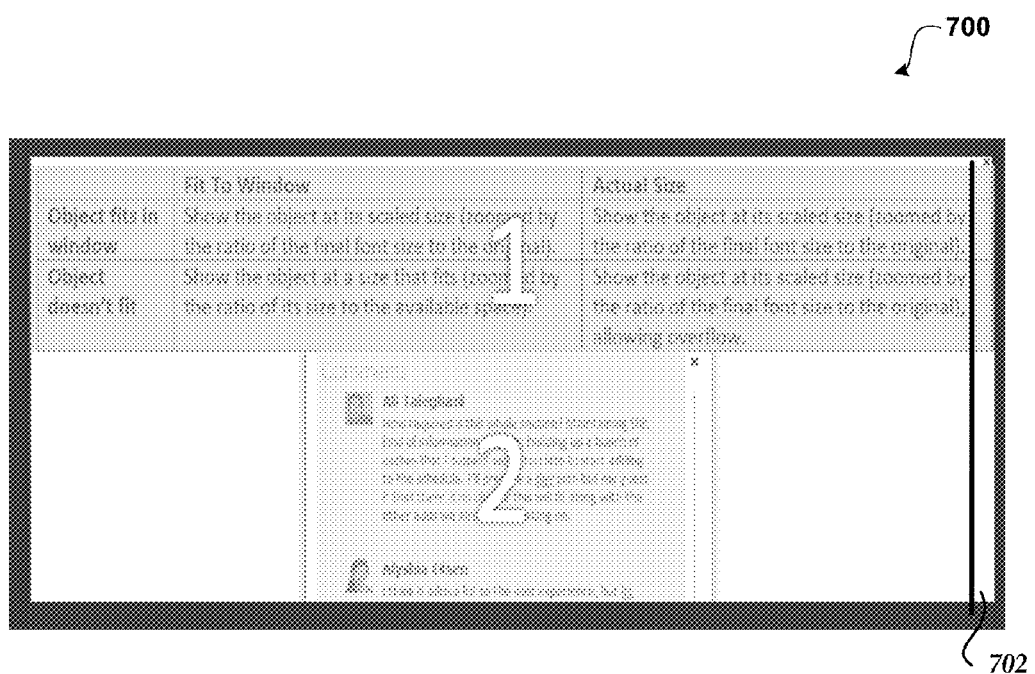
FIG. 7 shows a comments element displayed within the zoom window in response to receiving a selection of showing comments.

FIG. 7 shows a comments element displayed within the zoom window 700 in response to receiving a selection of showing comments.

When the comment hints (2) are selected to be displayed (e.g. selecting area 702 and/or selecting another option), a comment area surfaces above/near the zoomed object (1). The position of the comment area can vary based on the characteristics of the object. For example, if the object is taller than it is wide, the comments may be displayed next to the object. When the object is wider than it is tall, the comments may be placed below the object. When the object and comments do not both fit on the screen at the same time, the comments may be displayed in a popup window.

According to an embodiment, tapping or clicking on the zoomed object causes the comment hints to close. A user may also select a close button in the upper-right hand portion of the window to close the comment hints.

Figure 8:
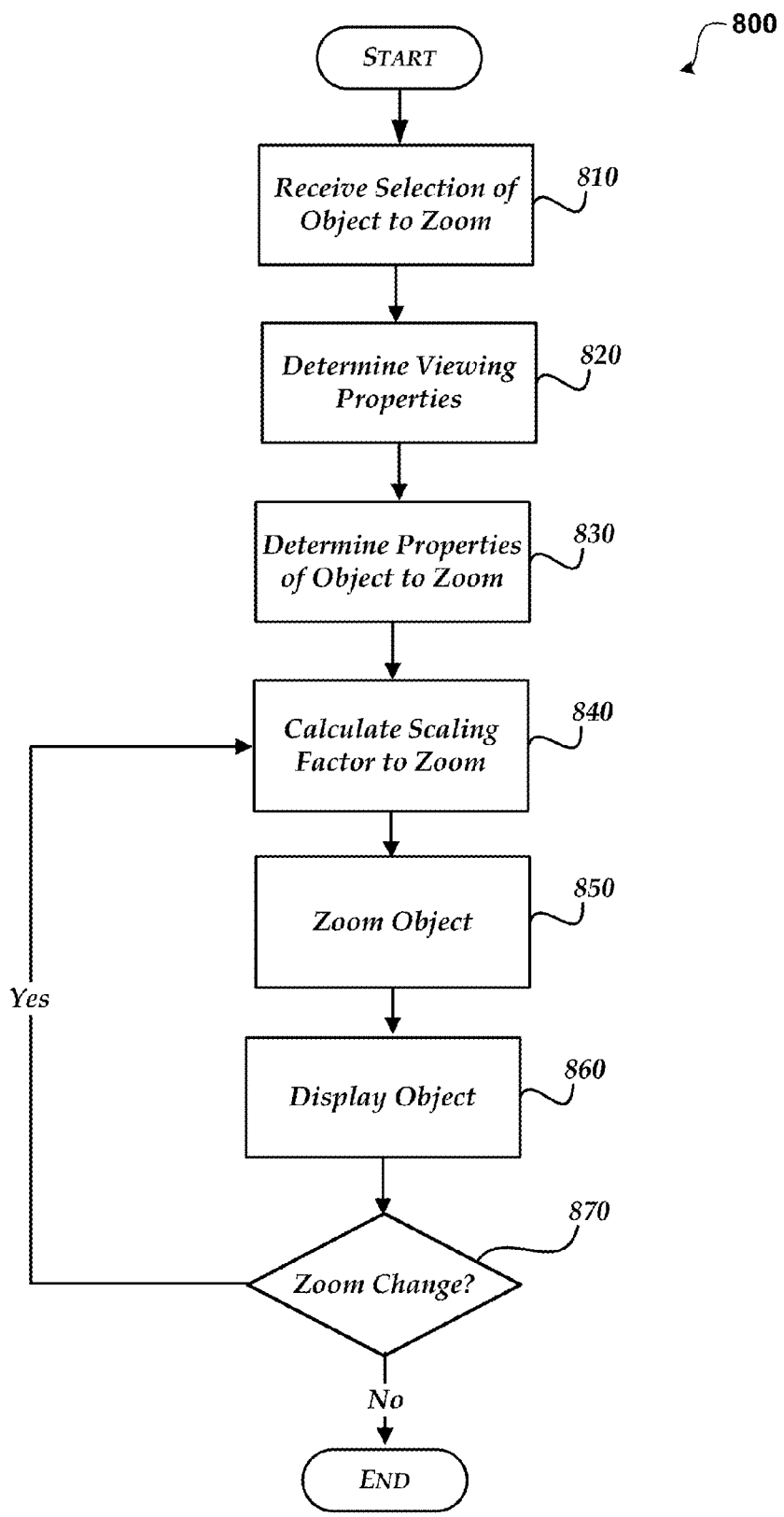
FIG. 8 shows a process for zooming an object.
Figure 9:
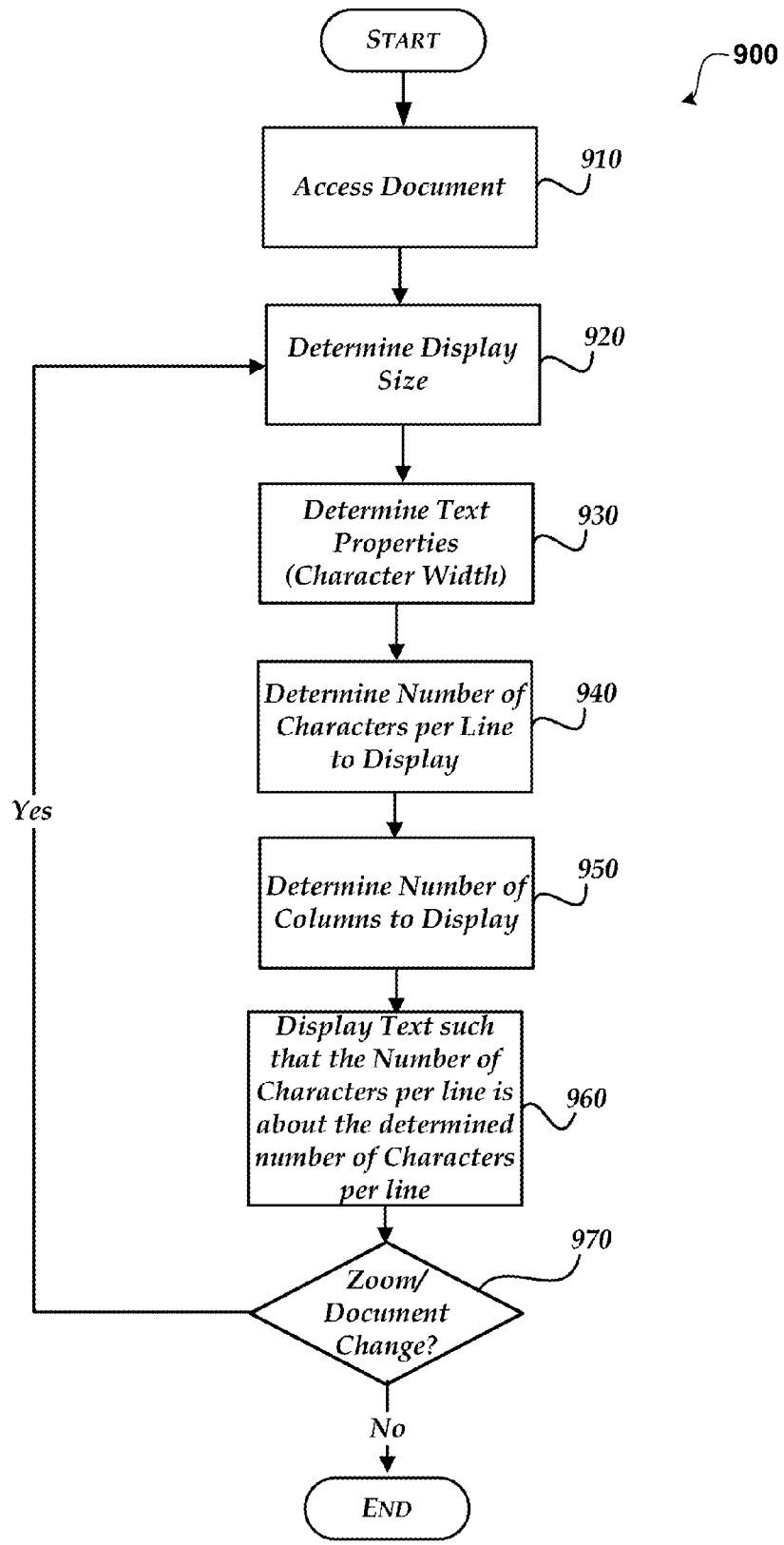
FIG. 9 illustrates a process for displaying text in a document.

FIGS. 8 and 9 shows illustrative processes for zooming an object and displaying text in a reading mode. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 8 shows a process for zooming an object.

After a start operation, the process 800 flows to operation 810, where an object to zoom is selected. The object may be a graphical image or a non-image object (e.g. table, interactive charts, textboxes, SMARTART graphics, and the like). The object may be selected by various means (e.g. touch input, cursor, stylus . . . ). For example, a user may tap on an object within a document to initiate the zooming process.

Moving to operation 820, viewing properties of the window in which the object is to be zoomed is determined. For example, the viewing properties may include a width and height of the window that displays the object, a current font size of text displayed with the display of the object, a zoom level applied to the document containing the object, defined page borders/margins, and the like.

Flowing to operation 830, properties of the object to zoom are determined. For example, is the object an image, not an image, a current text size used for text within the object, a current zoom level on the object and the like.

Transitioning to operation 840, a scaling factor to zoom the object to an initial zoom state is calculated. According to an embodiment, the scaling factor is based on the determined viewing properties and object properties. For example, the object may be initially be zoomed 145% since the other text in the document is currently displayed using a 16 point font, but the text in the object to zoom is currently at an 11 point font. Zooming the object to 145% displays the object similarly to the other content in the document. The scaling factor may be determined using other methods. For example, a zooming window may be sized based on the current viewable window area (e.g. 90% of the current viewable area). The object may then be zoomed to a level such that each dimension (horizontal and vertical) fit within the zoom window. For example, the object is zoomed such that at least one dimension of the object when zoomed is within a predetermined distance to an edge of the zoom window (e.g. 10%, 5%).

Moving to operation 850, the object is scaled/zoomed. The object may be scaled such that each of the parts of the object are scaled to the scaling factor.

Flowing to operation 860, the object is displayed. According to an embodiment, the object is displayed within a zoom window that may be closed when the user is done viewing the object in a zoomed state.

Transitioning to decision operation 870, a determination is made as to whether to change the zoom level of the object. For example, the user may desire to make the object smaller/larger, the window may be resized, the device characteristics change (e.g. a phone is rotated from landscape to portrait orientation, and the like. According to an embodiment, the zoom options are limited to a predetermined number of optimized zoom states instead of allowing a user to incrementally change a zoom level percentage (e.g. 1% larger, 2% larger . . . ). The predetermined zoom states may be determined based on a size of the currently zoomed object and available space within the zoom window. The zoom levels may also be based on a size of the object to increase a font size of the text within the object a predetermined amount (e.g. currently 12 point to 14, 18, 24 . . . ) sizes. According to an embodiment, there is one larger zoom level from the initial zoom level and one smaller zoom level compared to the initial zoom level for the object.

The process then moves to an end operation and returns to processing other actions.

FIG. 9 illustrates a process for displaying text in a document.

After a start operation, process 900 flows to operation 910, where a document is accessed. The document may be a word-processing document, a spreadsheet document, a presentation document (e.g. a slide), a drawing, and the like.

Moving to operation 920, a display size is determined. The display size is an area where the text is/will be displayed. When displaying text within a graphical window then the display size is the size of the window.

Flowing to operation 930, one or more text properties are determined. According to an embodiment, an average character width for the text within the document is determined. The average character width may be determined based on a standard font used within the document, an average of the font widths used within the document, an average font width used within each paragraph of the document, an average used within a selected area to display in a reading mode, and the like.

Transitioning to operation 940, a desired number of characters to display on each line of the display is determined. For example, the average number of characters may be determined to be at a value in the range from 50-75 to improve the readability of the document. According to an embodiment, the average number of characters to display for each line is set to 66 characters per line.

Moving to operation 950, a number of columns that may be displayed based on the display size is determined using the desired number of characters to display per line and the average width of a character. According to an embodiment, a horizontal slider (or some other control) is not added to display text that would go beyond a viewable area of a window. For example, if a column uses 4 inches and the display size is 7.5 inches, then one column is shown. When the column uses 4 inches and the display size is 9 inches, then two columns are used. A user may manually resize the window to change the display of the text to more/fewer columns. The number of characters to display per line may also be increased automatically to more optimally use the display space (e.g. within the 50-75 range). The window may also be automatically changed to be larger (e.g. two columns takes 8 inches to display and the window is currently set to 7.8 inches and there is space on the monitor to expand the window).

Flowing to operation 960, the text is displayed in the determined number columns such that the average number of characters per line that are displayed is approximately equal to the desired number of characters per line to display as determined in operation 940.

Transitioning to decision operation 970, a determination is made as to whether there is a zoom/document/display change that affects the number of characters that can be displayed. For example, a user may zoom the document, change a font size of the document and/or change a display size.

When there is a change, the process returns to operation 920 to recalculate the layout of the text such that the desired number of characters per line is attempted to be maintained.

The process then moves to an end operation and returns to processing other actions.

Figure 10:
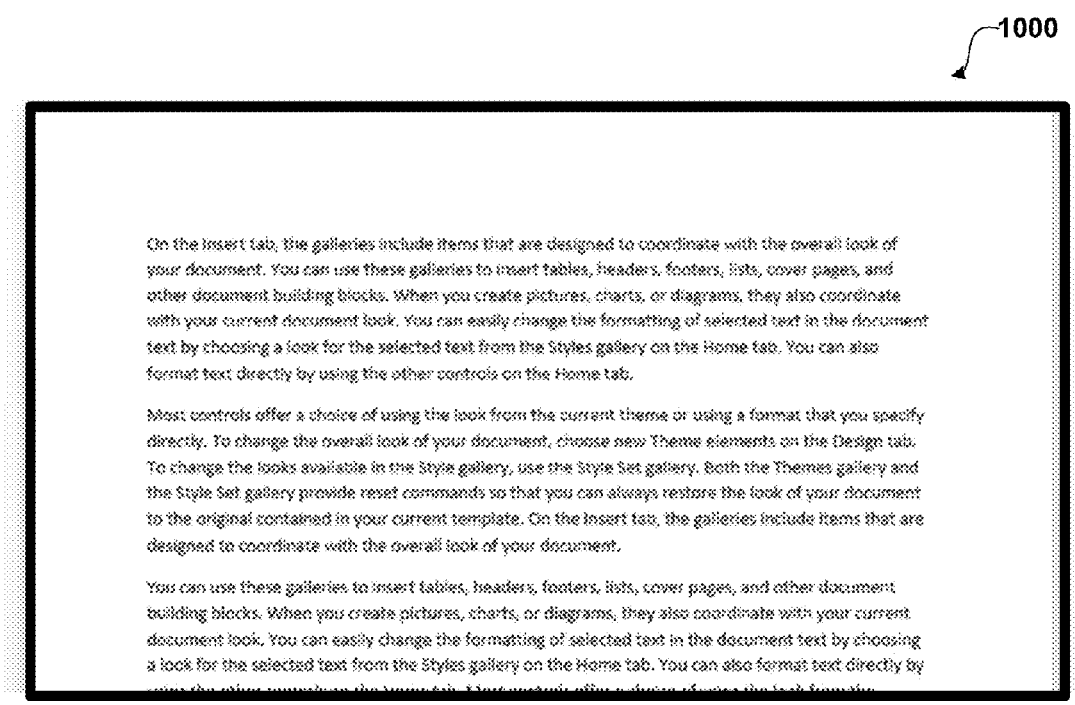
FIG. 10 shows an initial layout of text.

FIG. 10 shows an initial layout of text.

The text shown in display 1000 is not optimized for readability. Instead, as much text as fits within the page size is displayed. Many times, when a user increases text size, the page may exceed the window width, forcing the reader to scroll horizontally back and forth to view the text.

Figure 11:
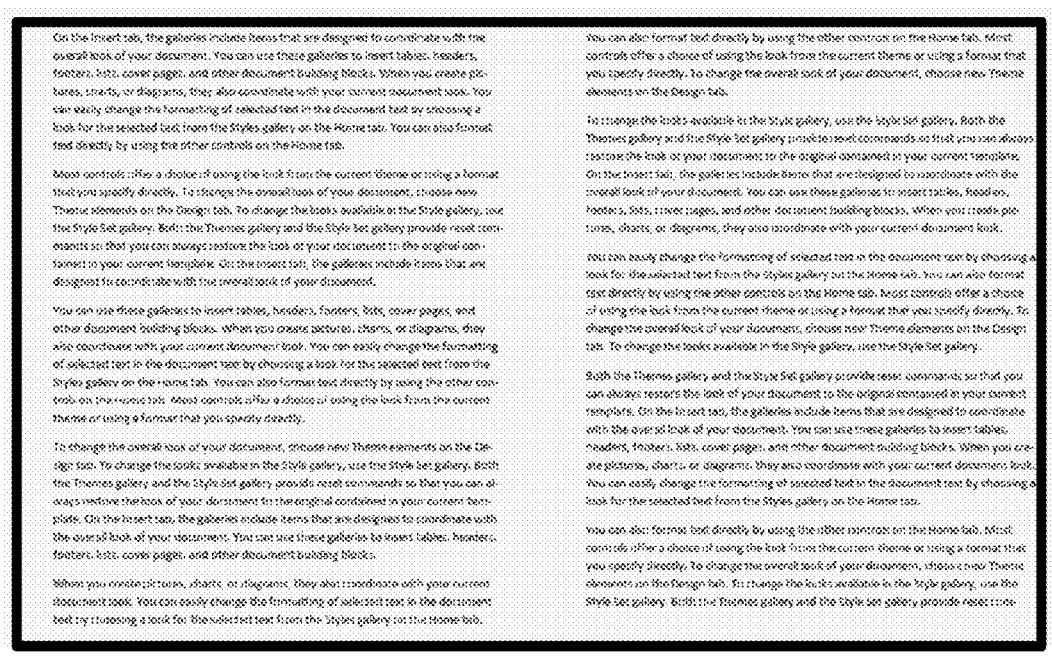
FIG. 11 shows a layout of text displayed for readability.

FIG. 11 shows a layout of text 1100 displayed for readability. The text shown in FIG. 11 is the text displayed in FIG. 10 that has been displayed to average approximately 66 characters per line within two columns. While 66 characters has been chosen as the average number of characters per line to display, other numbers may be used (e.g. somewhere near/between 50-76 characters per line). As can be seen, all of the text is shown within the window such that a user does not have to horizontally pan/scroll to see text.

FIG. 12 shows maintaining a ratio as a zoom level is increased for display of text 1200. The text shown in FIG. 12 is the text displayed in FIG. 11 and FIG. 10. In the current example, the user has increased the zoom level of the text. As a result of the zooming, the layout of the text has changed to one column but the text is still displayed to average approximately 66 characters per line. As can be seen, all of the text is shown within the window such that a user does not have to horizontally pan/scroll to see text.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for zooming an object, comprising:
   receiving a selection to zoom an object in a document having content in addition to the object;

determining, by a processor, a viewing property including a current font size of the content displayed with the object;

determining, by the processor, an object property relating to a current display of the object before zooming, wherein determining the object property comprises determining the font size of text within the object;

calculating, by the processor, a scaling factor that is used to zoom the object based at least in part on the viewing property and the object property, wherein the scaling factor causes the text in the object to match the font size of the content;

zooming the object based on the calculated scaling factor; and displaying the zoomed object on a display.

2. The method of claim 1, further comprising displaying the zoomed object in a zoom window above a display of the object.

3. The method of claim 2, further comprising displaying a comments box near a display of the zoomed object.

4. The method of claim 2, wherein calculating the scaling factor that is used to zoom the object comprises determining the scaling factor based on a single dimension of the object fitting within the zooming window after zooming the object.

5. The method of claim 2, wherein calculating the scaling factor that is used to zoom the object comprises determining the scaling factor based on a height dimension and a width dimension of the object fitting within the zooming window after zooming the object.

6. The method of claim 1, wherein the viewing property is a size of a font displayed within a document that includes the object.

7. The method of claim 1, wherein calculating the scaling factor that is used to zoom the object comprises determining a quotient of the font size of the content and the font size of the text in the object.

8. The method of claim 1, further comprising displaying two zooming options within the zooming window that adjusts the scaling factor to no more than a predetermined number of additional zoom levels.

9. The method of claim 1, wherein the scaling factor is calculated differently for the object and the content.

10. A computer-readable storage device, having computer-executable instructions for zooming an object, comprising:

receiving a selection of an object to zoom within a document having text displayed outside the object;

determining a viewing property including a current zoom level of the text displayed outside of the object;

calculating a scaling factor that is used to zoom the object to a zoom level that is similar to the zoom level of the text displayed outside of the object;

zooming the object using the scaling factor; and displaying the zoomed object within a zoom window.

11. The computer-readable storage device of claim 10, wherein determining the viewing property relating to the zoom level of text displayed outside of the object comprises determining a font size of the text.

12. The computer-readable storage device of claim 10, further comprising determining a window characteristic, a device characteristic, a font size of text within the object and using the window characteristic, the device characteristic and the font size of text within the object when calculating the scaling factor.

13. The computer-readable storage device of claim 10, wherein calculating the scaling factor that is used to zoom the object comprises determining the scaling factor based on at least a single dimension of the object fitting within the zooming window after zooming the object.

14. The computer-readable storage device of claim 10, wherein calculating the scaling factor that is used to zoom the object comprises determining the scaling factor based on a height dimension and a width dimension of the object fitting within the zooming window after zooming the object.

15. The computer-readable storage device of claim 10, further comprising displaying two zooming options within the zooming window that adjust the scaling factor to either a larger zooming level or a smaller zooming level.

16. The computer-readable storage device of claim 10, wherein calculating the scaling factor that is used to zoom the object comprises determining a font size of text within the object and a font size of the text displayed outside the object.

17. A system for zooming an object, comprising:

a processor and a computer-readable storage medium;

an operating environment stored on the computer-readable medium and executing on the processor; and instructions stored on the computer-readable medium that, when executed by the processor, perform the following operations:

receive a selection of an object to zoom within a document;

determine a viewing property relating to a current size of content displayed outside of the object;

calculate a scaling factor required to zoom the object to a zoom level corresponding to a zoom level of the content that is displayed outside of the object;

zoom the object using the scaling factor; and display the zoomed object within a zoom window.

18. The system of claim 17, wherein the calculated scaling factor that is used to zoom the object is based on a determination of at least a single dimension of the object fitting within the zooming window after the object has been zoomed.

19. The system of claim 17, wherein the calculated scaling factor that is used to zoom the object is based on a determination of a height dimension and a width dimension of the object fitting within the zooming window after the object has been zoomed.

20. The system of claim 17, wherein the operations further comprise: display two zooming options within the zooming window that adjust the scaling factor to either a larger zooming level or a smaller zooming level.

* * * * *